United States Patent [19]
Evans et al.

[11] 4,301,220
[45] Nov. 17, 1981

[54] NONAQUEOUS CELL WITH CATHODE COMPRISING THE REACTION PRODUCT OF BISMUTH TRIOXIDE AND MOLYBDENUM TRIOXIDE

[75] Inventors: William P. Evans, Rocky River; Violeta Z. Leger, North Olmsted, both of Ohio

[73] Assignee: Union Carbide Corporation, New York, N.Y.

[21] Appl. No.: 162,589

[22] Filed: Jun. 24, 1980

[51] Int. Cl.³ .............................................. H01M 6/14
[52] U.S. Cl. .................................... 429/197; 429/218
[58] Field of Search ...................... 429/194, 197, 218; 423/606, 617

[56] References Cited

U.S. PATENT DOCUMENTS

| | | | |
|---|---|---|---|
| 3,542,602 | 11/1970 | Gabano | 429/194 |
| 3,711,334 | 1/1973 | Dey et al. | 136/100 R |
| 3,822,148 | 7/1974 | Dey et al. | 136/83 |
| 4,085,259 | 4/1978 | Lauck | 429/194 |
| 4,158,723 | 6/1979 | Gabano et al. | 429/197 |

OTHER PUBLICATIONS

Chem. Abs. 80:113130n, Stability Aspects and Olefin Adsorption Properties of Bismuth Molybdenum Oxide ($Bi_2Mo_2O_9$) Batist et al., J. C. et al. 1974 pp. 362–368.
Chem. Abs. 86:111681t Bismuth (III) Oxide-Molybdenum (VI) Oxide, Kargin et al., Izv. Akad Nauk SSSR, 1977, pp. 132–134.
Chem. Abs. 71:119068j Preparation of $Bi_2O_3 2MoO_3$, Wojcik Rocz Chem. 1969, pp. 889–894.

Primary Examiner—Charles F. LeFevour
Attorney, Agent, or Firm—Cornelius F. O'Brien

[57] ABSTRACT

A solid cathode material comprising the thermal reaction product of bismuth trioxide and molybdenum trioxide for use in nonaqueous electrochemical cell systems using active metal anodes, such as lithium, and organic electrolytes, such as electrolytes based on 3-methyl-2-oxazolidone in conjunction with a cosolvent and a selected solute.

7 Claims, 4 Drawing Figures

NONAQUEOUS CELL WITH CATHODE COMPRISING THE REACTION PRODUCT OF BISMUTH TRIOXIDE AND MOLYBDENUM TRIOXIDE

FIELD OF THE INVENTION

The invention relates to a nonaqueous cell utilizing a highly active metal anode, a cathode selected from the group consisting of the thermal reaction product of about one to three moles of bismuth trioxide and about one to two moles of molybdenum trioxide, and a liquid organic electrolyte such as 3-methyl-2-oxazolidone in conjunction with a cosolvent and a selected solute.

BACKGROUND OF THE INVENTION

The development of high energy battery systems requires the compatibility of an electrolyte possessing desirable electrochemical properties with highly reactive anode materials, such as lithium, sodium, and the like and the efficient use of high energy density cathode materials. The use of aqueous electrolytes is precluded in these systems since the anode materials are sufficiently active to react with water chemically. It has, therefore, been necessary in order to realize the high energy density obtainable through the use of these highly reactive anodes and high energy density cathodes to turn to the investigation of nonaqueous electrolyte systems and more particularly to nonaqueous organic electrolyte systems. A large number of nonaqueous organic electrolyte solutions is taught in the art as being suitable for a wide variety of cell systems.

Although a large number of known solid cathode materials is suitable for nonaqueous cell systems, there is always a need for new solid cathode materials to help fill the demand created by the large number of battery-powered devices being marketed. For example, the toy industry has recently embarked upon a program of marketing a multiplicity of computerized games some of which are educational in nature. Many of these devices require portable power source and, therefore, any new cell system would be welcomed.

U.S. Pat. No. 3,822,149 discloses nonaqueous cells having cathodes of metal molybdates in specific organic types of electrolyte solutions. A cathode of $Bi_2(MoO_4)_3$ is disclosed in one of the examples.

It is an object of the present invention to provide new solid cathode materials for nonaqueous cell systems.

It is another object of the present invention to provide a new nonaqueous cell system employing new solid cathode materials consisting of the thermal reaction product of about one to three mole of bismuth trioxide and about one to two moles of molybdenum trioxide.

It is another object of the present invention to provide a new nonaqueous cell system employing an active metal anode, an organic electrolyte based on 3-methyl-2-oxazolidone and an active cathode consisting of the thermal reaction product of one mole of bismuth trioxide and two moles of molybdenum trioxide.

SUMMARY OF THE INVENTION

The invention is directed to a new solid cathode material for electrochemical cell systems which comprises a cathode material comprising the thermal reaction product of bismuth trioxide and molybdenum trioxide having a mole ratio of bismuth trioxide to molybdenum trioxide of between about 1:2 and about 3:1. Although not wanting to be bound by theory, it is believed that the following two reactions occur for the mole proportions shown:

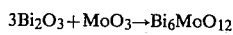

$$3Bi_2O_3 + MoO_3 \rightarrow Bi_6MoO_{12}$$

$$Bi_2O_3 + 2MoO_3 \rightarrow Bi_2Mo_2O_9$$

These cathode materials as listed above can be obtained by mixing together the appropriate moles of the specific components and then heating them in an enclosed vessel at a temperature of between 750° C. and 950° C., preferably between 780° and 825° C., for a time sufficient to insure reaction. Upon cooling, the reaction products can be ground to a powder and, if desired, mixed with a binder, a conductive agent and the like. Suitable binders would include polytetrafluoroethylene, polyethylene, polysulfone, polypropylene and polyamide, and conductive agents would include graphite, carbon, and metal powders such as lead or bismuth.

The solid cathode materials formed by the thermal reaction of bismuth trioxide and molybdenum trioxide in the above proportions have been found to be ideally suited for use in nonaqueous cell systems.

Useful highly active metal anode materials include aluminum, the alkali metals, alkaline earth metals and alloys of alkali metals or alkaline earth metals with each other and other metals. The term "alloy" as used herein and in the appended claims is intended to include mixtures, solid solutions, such as lithium-magnesium, and intermetallic compounds, such as lithium monoaluminide. The preferred anode materials are lithium, sodium, potassium, calcium and alloys thereof.

Useful organic solvents employed alone or mixed with one or more other solvents for use in this invention include the following classes of compounds:

Alkylene nitriles: e.g., crotonitrile (liquid range −51.1° C. to 120° C.)

Trialkyl borates: e.g., trimethyl borate, $(CH_3O)_3B$ (liquid range −29.3° to 67° C.)

Tetraalkyl silicates: e.g., tetramethyl silicate, $(CH_3O)_4Si$ (boiling point 121° C.)

Nitroalkanes: e.g., nitromethane, $CH_3NO_2$ (liquid range −17° to 100.8° C.)

Alkylnitriles: e.g., acetonitrile, $CH_3CN$ (liquid range −45° to 81.6° C.)

Dialkylamides: e.g., dimethylformamide, $HCON(CH_3)_2$ (liquid range −60.48° to 149° C.)

Lactams: e.g., N-methylpyrrolidone,

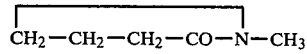

$CH_2-CH_2-CH_2-CO-N-CH_3$ (liquid range −16° to 202° C.)

Tetraalkylureas: e.g., tetramethylurea, $(CH_3)_2N-CO-N(CH_3)_2$ (liquid range −1.2° to 166° C.)

Monocarboxylic acid esters: e.g., ethyl acetate (liquid range −83.6° to 77.06° C.)

Orthoesters: e.g., trimethylorthoformate, $HC(OCH_3)_3$ (boiling point 103° C.)

Lactones: e.g., γ-(gamma)butyrolactone,

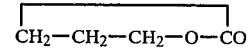

$CH_2-CH_2-CH_2-O-CO$ (liquid range −42° to 206° C.)

Dialkyl carbonates: e.g., dimethyl carbonate, OC(OCH₃)₂ (liquid range 2° to 90° C.)

Alkylene carbonates: e.g., propylene carbonate,

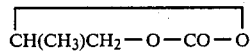

(liquid range −48° to 242° C.)

Monoethers: e.g., diethyl ether (liquid range −116° to 34.5° C.)

Polyethers: e.g., 1,1- and 1,2-dimethoxyethane (liquid ranges −113.2° to 64.5° C. and −58° to 83° C., respectively)

Cyclic ethers: e.g, tetrahydrofuran (liquid range −65° to 67° C.); 1,3-dioxolane (liquid range −95° to 78° C.)

Nitroaromatics: e.g., nitrobenzene (liquid range 5.7° to 210.8° C.)

Aromatic carboxylic acid halides: e.g., benzoyl chloride (liquid range 0° to 197° C.); benzoyl bromide (liquid range −24° to 218° C.)

Aromatic sulfonic acid halides: e.g., benzene sulfonyl chloride (liquid range 14.5° to 251° C.)

Aromatic phosphonic acid dihalides: e.g., benzene phosphonyl dichloride (boiling point 258° C.)

Aromatic thiophosphonic acid dihalides: e.g., benzene thiophosphonyl dichloride (boiling point 124° C. at 5 mm.)

Cyclic sulfones: e.g., sulfolane,

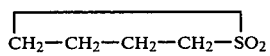

(melting point 22° C.); 3-methylsulfolane (melting point −1° C.)

Alkyl sulfonic acid halides: e.g., methanesulfonyl chloride (boiling point 161° C.)

Alkyl carboxylic acid halides: e.g., acetyl chloride (liquid range −112° to 50.9° C.); acetyl bromide (liquid range −96° to 76.° C.); propionyl chloride (liquid range −94° to 80° C.)

Saturated heterocyclics: e.g., tetrahydrothiophene (liquid range −96° to 121° C.); 3-methyl-2-oxazolidone (melting point 15.9° C.)

Dialkyl sulfamic acid halides: e.g., dimethyl sulfamyl chloride (boiling point 80° C. at 16 mm.)

Alkyl halosulfonates: e.g., ethyl chlorosulfonate (boiling point 151° C.)

Unsaturated heterocyclic carboxylic acid halides: e.g., 2-furoyl chloride (liquid range −2° to 173° C.)

Five-membered unsaturated heterocyclics: e.g., 3,5-dimethylisoxazole (boiling point 140° C.); 1-methylpyrrole (boiling point 114° C.); 2,4-dimethylthiazole (boiling point 144° C.); furan (liquid range −85.65° to 31.36° C.)

Esters and/or halides of dibasic carboxylic acids: e.g., ethyl oxalyl chloride (boiling point 135° C.)

Mixed alkyl sulfonic acid halides and carboxylic acid halides: e.g., chlorosulfonyl acetyl chloride (boiling point 98° C. at 10 mm.)

Dialkyl sulfoxides: e.g., dimethyl sulfoxide (liquid range 18.4° to 189° C.)

Dialkyl sulfates: e.g., dimethylsulfate (liquid range −31.75° to 188.5° C.)

Dialkyl sulfites: e.g., dimethylsulfite (boiling point 126° C.)

Alkylene sulfites: e.g., ethylene glycol sulfite (liquid range −11° to 173° C.)

Halogenated alkanes: e.g., methylene chloride (liquid range −95° to 40° C.); 1,3-dichloropropane (liquid range −99.5° to 120.4° C.)

Of the above, the preferred solvents are sulfolane; crotonitrile; nitrobenzene; tetrahydrofuran; methyl-substituted tetrahydrofuran; 1,3-dioxolane; 3-methyl-2-oxazolidone; propylene carbonate; γ-butyrolactone; ethylene glycol sulfite; dimethylsulfite; dimethyl sulfoxide; and 1,1- and 1,2-dimethoxyethane. Of the preferred solvents, the best are sulfolane; 3-methyl-2-oxazolidone; propylene carbonate 1,1- and 1,2-dimethoxyethane, and 1,3-dioxolane because they appear more chemically inert to battery components and have wide liquid ranges, and especially because they permit highly efficient utilization of the cathode materials.

The best electrolyte for use in this invention is a 3-methyl-2-oxazolidone-based electrolyte. Liquid organic 3-methyl-2-oxazolidone material, (3Me2Ox)

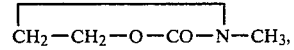

is an excellent nonaqueous solvent because of its high dielectric constant, chemical inertness to battery components, wide liquid range and low toxicity.

However, it has been found that when metal salts are dissolved in liquid 3Me2Ox for the purpose of improving the conductivity of 3Me2Ox, the viscosity of the solution may be too high for its efficient use as an electrolyte for some nonaqueous cell applications other than those requiring very low current drains. Thus, in some applications in accordance with this invention, the addition of a low viscosity cosolvent would be desirable if 3Me2Ox is to be used as an electrolyte for nonaqueous cells which can operate or perform at a high energy density level.

The low viscosity cosolvents which can be used along with 3Me2Ox include tetrahydrofuran (THF), methyl-substituted tetrahydrofuran (Met-THF) dioxolane (DIOX), dimethoxyethane (DME), propylene carbonate (PC), dimethyl isoxazole (DMI), diethyl carbonate (DEC), ethylene glycol sulfite (EGS), dioxane, dimethyl sulfite (DMS) or the like. Dimethoxyethane (DME), dioxolane (DIOX) and propylene carbonate (PC) are preferred cosolvents because of their compatibility with metal salts dissolved in liquid 3Me2Ox and their chemical inertness to cell components. Specifically, the total amount of the low viscosity cosolvent added could be between about 20% and about 80% based on total solvent volume, i.e., exclusive of solute, so as to lower the viscosity to a level suitable for use in a high drain cell.

The ionizing solute for use in the invention may be a simple or double salt or mixtures thereof, which will produce an ionically-conductive solution when dissolved in one or more solvents. Preferred solutes are complexes of inorganic or organic Lewis acids and inorganic ionizable salts. The only requirements for utility are that the salts, whether simple or complex, be compatible with the solvent or solvents being employed and that they yield a solution which is sufficiently ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226 - July/December 1938, pages 293–313 G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an inorganic ionizable salt may be used as such or the individual components may be added to the solvent separately to form the double salt or the resulting ions in situ. One such double salt, for example, is that formed by the combination of aluminum chloride and lithium chloride to yield lithium aluminum tetrachloride.

EXAMPLE I

Figure 1:
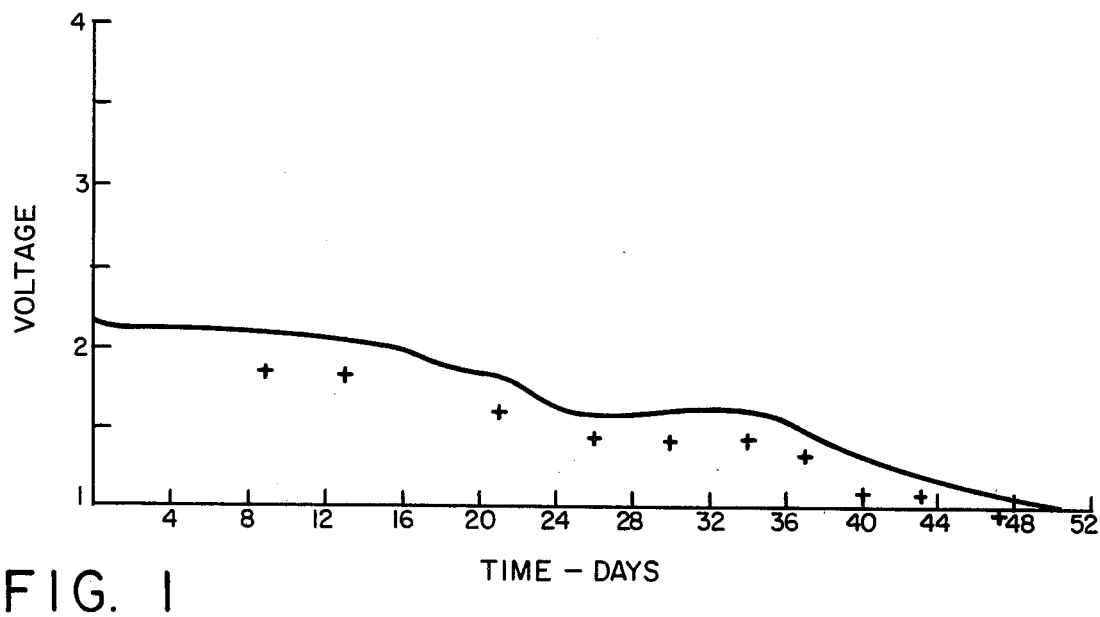
FIG. 1 contains data showing the discharge characteristics of the cell disclosed and described in Example 1.

A flat-type cell was constructed utilizing a stainless steel base having therein a shallow depression into which the cell contents were placed and over which a stainless steel cap was placed to close the cell. The contents of each sample cell consisted of a 0.591 inch diameter lithium disc (0.114 g) having a total thickness of 0.050 inch, about 1.5 ml of an electrolyte consisting of about 40 vol. % dioxolane, about 30 vol. % dimethoxyethane (DME), about 30 vol. % 3Me2Ox plus about 0.1% dimethylisoxazole (DMI) nd containing 1 M $LiCF_3SO_3$, a 0.875 inch diameter porous nonwoven polypropylene separator (0.01 inch thick) which absorbed some of the electrolyte and 0.438 gram of a cathode mix compressed to form a cathode. The cathode mix consisted of 90% by weight of the thermal reaction product of 1 mole of bismuth trioxide and 2 moles of molybdenum trioxide and 10% by weight graphite. The cell was discharged across a 15 K-ohm load and the voltage observed with time is shown as the curve in FIG. 1. In addition, at various time periods, the cell was discharged across at 1 K-ohm load (pulse discharge) for about 2 seconds, and the voltages observed are shown as the points identified as "+" in FIG. 1.

EXAMPLE II

Figure 2:
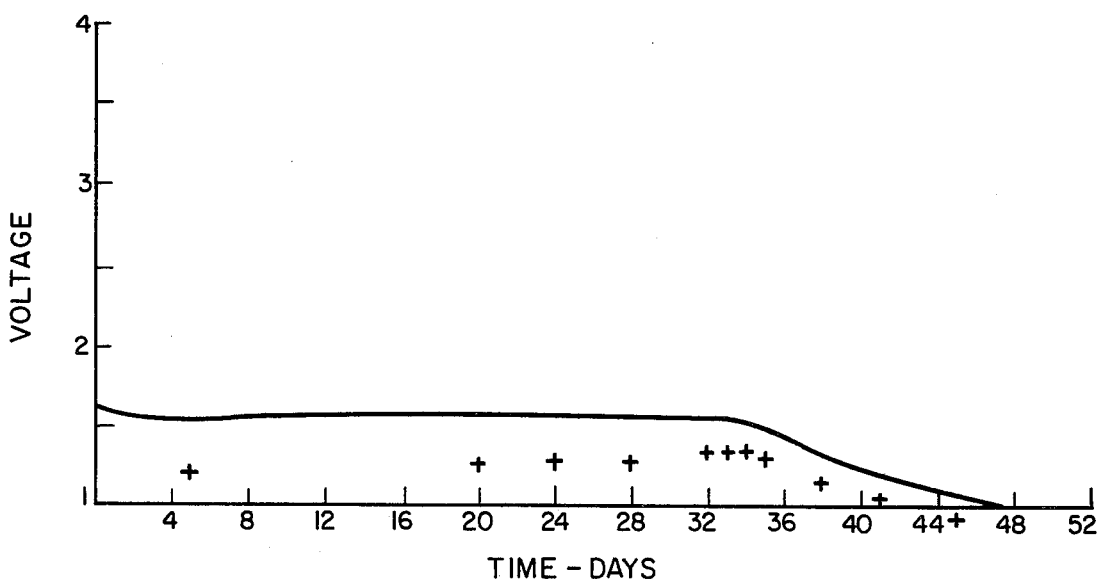
FIG. 2 contains data showing the discharge characteristics of the cell disclosed and described in Example 2.

A flat-type cell was constructed as in Example I except that in the cathode mix which weighed 0.377 grams, the 10% by weight graphite was replaced with 10% by weight lead powder. The cell was tested as described in Example I and the data obtained are shown in FIG. 2.

EXAMPLE III

Figure 3:
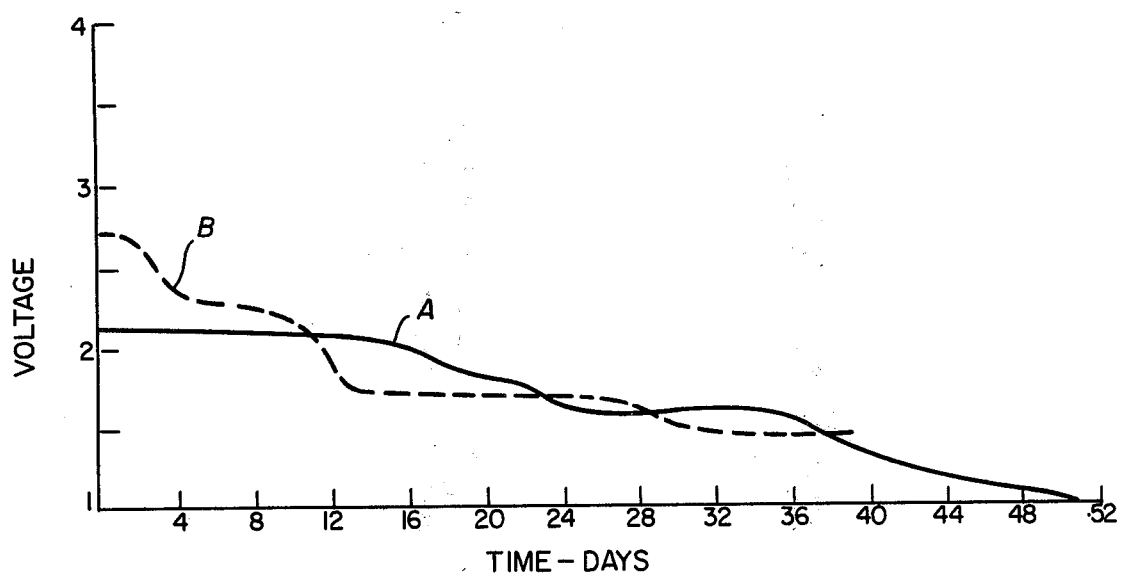
FIG. 3 contains data showing the discharge characteristics of two cells disclosed and described in Example 3.

The discharge data for the flat-type cell of Example I is again shown in FIG. 3 as Curve A. A similar second flat-type cell was constructed except that the same proportions of bismuth trioxide and molybdenum trioxide were only physically mixed and not thermally reacted. This cell was also discharged across a 15 K-ohm load. The voltage observed with time is shown plotted in FIG. 3 as curve B. As evident from data shown in FIG. 3, the thermally reacted cathode exhibited a relatively flat discharge profile as compared to the performance of the physical mixture cathode.

EXAMPLE IV

Figure 4:
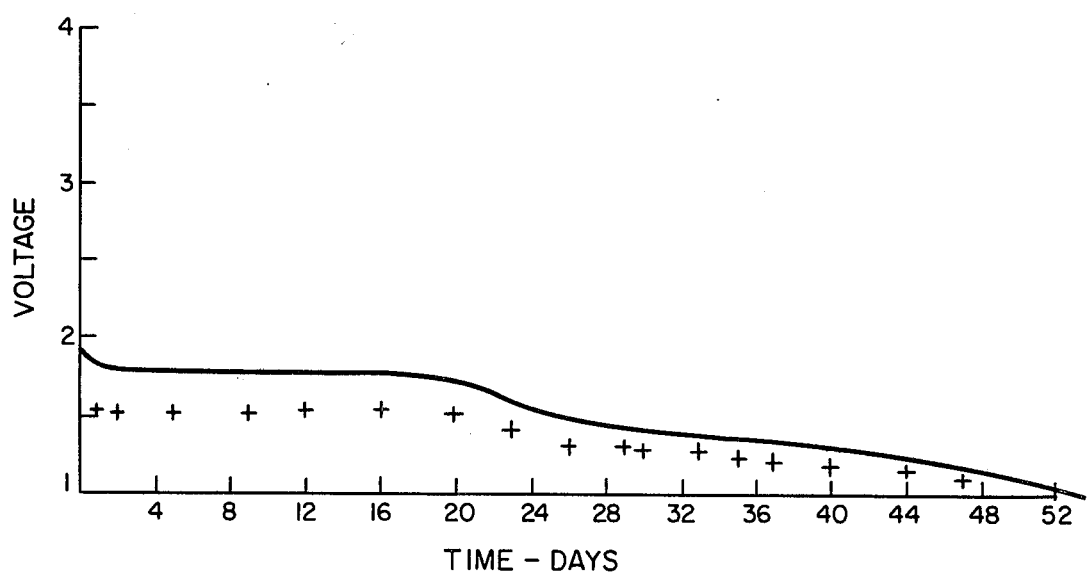
FIG. 4 contains data showing the discharge characteristics of the cell disclosed and described in Example 4.

A flat-type cell was constructed as in Example I except that the thermal reaction product employed as the cathode material was three moles of bismuth trioxide and one mole of molybdenum trioxide. In addition the cathode mix contained 10% by weight carbon and 5% by weight polytetrafluoroethylene. The cell was tested as described in Example I and the data obtained are shown in FIG. 4.

While the present invention has been described with reference to many particular details thereof, it is not intended that these details shall be construed as limiting the scope of this invention.

What is claimed is:

1. A nonaqueous cell comprising an active metal anode, an organic electrolyte solution comprising an organic solvent with an inorganic salt dissolved therein and a solid cathode material comprising the thermal reaction product of bismuth trioxide and molybdenum trioxide having a mole ratio of bismuth trioxide to molybdenum trioxide of between about 1:2 and about 3:1.

2. The nonaqueous cell of claim1 1 wherein the thermal reaction product is 1 mole of bismuth trioxide and 2 moles molybdenum trioxide.

3. The nonaqueous cell of claim 1 wherein the thermal reaction product is 3 moles of bismuth trioxide and 1 mole of molybdenum trioxide.

4. The nonaqueous cell of claim 1 wherein at least one material selected from the group consisting of graphite, carbon, lead, bismuth, polytetrafluoroethylene polyethylene, polysulfone, polypropylene and polyamide is added to the solid cathode material.

5. The nonaqueous cell of claim 1, 2, 3 or 4 wherein the active metal anode is selected from the group consisting of lithium, sodium, potassium, calcium and alloys thereof.

6. The nonaqueous cell of claim 1, 2, 3 or 4 wherein the solvent of the electrolyte is at least one solvent selected from the group consisting of sulfolane; crotonitrile; nitrobenzene; tetrahydrofuran; methyl-substituted tetrahydroufuran; 1,3-dioxolane; 3-methyl-2-oxazolidone; propylene carbonate; γ-butyrolactone; ethylene glycol sulfite; dimethysulfite; dimethyl sulfoxide; 1,1- and 1,2-dimethoxyethane; and dimethyl isozazole.

7. The nonaqueous cell of claim 6 wherein said at least one solvent is 3-methyl-2-oxazolidone along with a low viscosity solvent selected from the group consisting of tetrahydrofuran, methyl-substituted tetrahydrofuran, dioxolane, dimethoxyethane, dimethyl isoxazole, diethyl carbonate, ethylene glycol sulfite, dioxane and dimethyl sulfite.

* * * * *